United States Patent
Hayward et al.

(10) Patent No.: US 6,552,681 B1
(45) Date of Patent: Apr. 22, 2003

(54) METHOD FOR DETERMINING VERTICAL AND HORIZONTAL GPS POSITION USING ALTITUDE INFORMATION

(75) Inventors: Roger Hayward, San Francisco, CA (US); Richard Fuller, Campbell, CA (US)

(73) Assignee: SkyNetix, LLC, Fountain Valley, CA (US)

( * ) Notice: Subject to any disclaimer, the term of this patent is extended or adjusted under 35 U.S.C. 154(b) by 0 days.

(21) Appl. No.: 09/969,891

(22) Filed: Oct. 2, 2001

Related U.S. Application Data

(60) Provisional application No. 60/237,420, filed on Oct. 2, 2000.

(51) Int. Cl.$^7$ .............................. G01S 5/02; H04B 7/185
(52) U.S. Cl. .............................. 342/357.06; 342/357.13; 701/213
(58) Field of Search .................. 342/357.06, 357.09, 342/357.1, 357.13; 701/213

(56) References Cited

U.S. PATENT DOCUMENTS 6,366,851 B1 * 4/2002 Chojnacki et al. .......... 701/208

* cited by examiner

*Primary Examiner*—Theodore M. Blum
(74) *Attorney, Agent, or Firm*—Townsend and Townsend and Crew LLP

(57) ABSTRACT

A method of using altitude information to arrive at a more accurate GPS position. A 3D GPS position is used as an initial estimate. The latitude and longitude of the initial estimate are used to retrieve an altitude from a database. This altitude is used to calculate a 2D GPS position. The 2D GPS position is then used to retrieve another altitude from the database, and the calculate-retrieve process is continued until the calculation converges.

47 Claims, 3 Drawing Sheets

METHOD FOR DETERMINING VERTICAL AND HORIZONTAL GPS POSITION USING ALTITUDE INFORMATION

CROSS-REFERENCES TO RELATED APPLICATIONS

This application is related to and claims benefit of U.S. Provisional Application No. 60/237,420, entitled "Method for Determining Vertical and Horizontal GPS Position Using Altitude Information" filed Oct. 2, 2000, which is hereby incorporated by reference in its entirety.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

Navigation is key to national and international industry, commerce, and safety. Knowledge of position, both relative and absolute has been used throughout history to gain tactical advantage in both peaceful and not-so-peaceful pursuits. From the rudimentary techniques developed over two millennia ago, people all over the world have made both evolutionary and revolutionary progress in the business of knowing their position. Navigation progressed from simple piloting, the art of connecting known points, to satellite-based navigation systems.

Today the premier worldwide navigation solution is the Global Positioning System (GPS). This satellite-based navigation system was developed by the Department of Defense (DoD) to support a variety of military operations. This system has been utilized in a variety of civilian systems. As the adoption of satellite based navigation technology has grown since its introduction in the early 1980's, the number and complexity of devices for personal navigation and location. GPS is broken down into three basic segments, as follows: 1) Space, comprising the satellites; 2) Control, incorporating tracking and command centers; and 3) User, performing navigation functions based on ranging to the satellites.

The space segment contains the GPS Space Vehicles (SV) placed in circular orbits with 55° inclination, a semi-major axis of 26,560 km (20,182 km altitude) corresponding to an orbital period of 12 hours sidereal. There are six orbit planes placed at 60° offsets in longitude with nominally four satellites in each plane, giving 24 satellites. Currently there are 28 active satellites in the planes. Spacing within the plane is adjusted to achieve optimal coverage over regions of interest. The satellites themselves are three-axis stabilized and use solar panels to provide power. Each satellite contains a pair of atomic clocks (for redundancy) which have a stability of 1 part in $10^{13}$. Each satellite broadcasts on two frequencies, 1575.42 MHz (L1) and 1278.6 MHz (L2). The L1 signal contains two separate pseudorandom noise (PRN) modulations: 1) the Clear Acquisition (C/A) code at bit or 'chipping' rate of 1.023 MHz (i.e., each millisecond there are 1023 modulated bits or 'chips' transmitted); and 2) the so-called 'P' code which has a chipping rate of 10.23 MHz or 10 times that of the C/A code. The L2 signal only contains the P code. GPS uses a PRN coding sequence of bits that have a specified length but have the property that different codes do not strongly correlate with one another (i.e., they are orthogonal). The C/A code is 1023 chips long and thus repeats every 1 millisecond. The full P code length is 38 weeks but is truncated to 1 week.

The control segment is responsible for the operation and maintenance of the Global Positioning System. There are five monitoring stations worldwide at Kwajalein, Hawaii, Colorado Springs, Diego Garcia and Ascension. These stations measure the discrepancies between the satellite state information (satellite positions and clock) as well as health of the satellites. The Master Control Station (MCS) in Colorado Springs formulates predicted values and uploads them to the satellites. This data is then included in the new message for broadcast to the users.

The user segment comprises GPS receivers that decode the satellite messages and determine the ranges to at least four GPS SVs to determine 3D position and the receiver clock offset. Users break down into two main groups: authorized and unauthorized. Authorized users have full access to both the C/A and P codes. Authorized users are restricted to the military and other special groups or projects with special permission from the DoD. Unauthorized users generally cannot access the P codes as the code itself is encrypted before broadcast by a process known as anti-spoofing (AS). This makes the process of emulating a GPS signal to the authorized user more difficult. The encrypted modulated signal is known as Y code. Additionally the hand-over-word (HOW) between the C/A and Y code is also encrypted. Authorized users are given a 'key' that allows for the decryption of the HOW as well as the Y code. Authorized user receiver equipment with dual frequency code access utilizes what is known as the Precise Positioning Service (PPS).

GPS receivers are very sensitive devices capable of measuring the low signal levels available on, or near, the surface of the Earth. A GPS receiver design incorporates radio frequency (RF) elements, signal downconversion, signal sampling, digital signal processing, as well as computational devices and methods. Nominally, at least four timing measurements are combined to solve for a position solution and time offset from a given time reference at a given time (or epoch). Much GPS determination today determines a three-dimensional (3D) position of the receiver (see, for example, B. W. Parkinson et al., *Global Positioning System: Theory and Applications, Volumes I and II*, (Progress in Astronautics and Aeronautics, American Institute of Aeronautics and Astronautics, 1996)); that is, the latitude, longitude and altitude of the receiver are assumed to be unknown, and the GPS receiver determines its 3D position using what is referred to as a 3D-plus-clock solution.

Sometimes, the arrangement of the satellites being tracked provides poor geometry so an accurate 3D-plus-clock solution is impossible. In these cases, numerous alternatives are generally pursued today. As a first alternative, it is common practice to remove the altitude component from the position computation. The problem with the first alternative is that the user's altitude information is not solved for, but is assumed by an a priori guess. This guess is either some fixed number (e.g., 0 meters altitude, sea level) or an "altitude-hold" using the last known altitude. This is an important drawback because altitude can change significantly over time and either fixed altitudes or altitude-hold modes can introduce errors not only in altitude but also in horizontal positioning.

In a second alternative (see, for example, U.S. Pat. No. 6,055,477), the position solution is augmented by separate altitude sensors. The second alternative for fixing the problem requires additional hardware, thus increasing the complexity and cost of the positioning device.

In a third alternative (see, for example, U.S. Pat. No. 6,061,018), the GPS receiver interfaces with a cellular communications system and the altitude of the GPS receiver is determined based on the altitude of the cell. However, this appears to limit the altitude used in the calculations to the single altitude associated with the cell (even though it may be an average of altitudes in the cell), regardless of the actual altitude of the GPS device.

There is a need to determine the position of a GPS receiver in a manner different from the traditional methods when the 3D-plus-clock solution is inaccurate.

BRIEF SUMMARY OF THE INVENTION

The current invention overcomes the problem without the aforementioned drawbacks of the traditional methods. This invention uses an iterative approach to remove the true local altitude from the solution without adding additional hardware or cost to the remote location device.

In the present invention, the inaccurate 3D position can be used to localize the position well enough to get a crude altitude. This altitude forms the basis or "guess" to remove it from the 2D position estimation process. A new 2D position estimate will form the basis for the lookup into a table for altitude which is used for the next 2D position estimate, and so on. By utilizing altitude the horizontal position solution can be constrained to minimize the error in altitude.

According to one embodiment, a method according to the present invention includes the acts of receiving GPS measurements from a GPS device; calculating, as a three-dimensional solution, an initial position of the GPS device from said GPS measurements; determining, from a database, an initial altitude corresponding to an initial latitude and an initial longitude of the initial position; calculating, as a two-dimensional solution using the initial altitude, a revised position of the GPS device from the GPS measurements; and repeating the altitude determination and 2D solution calculation until the position converges.

These and other features of the invention are detailed in the following description and accompanying drawings.

DETAILED DESCRIPTION OF THE INVENTION

Figure 1:
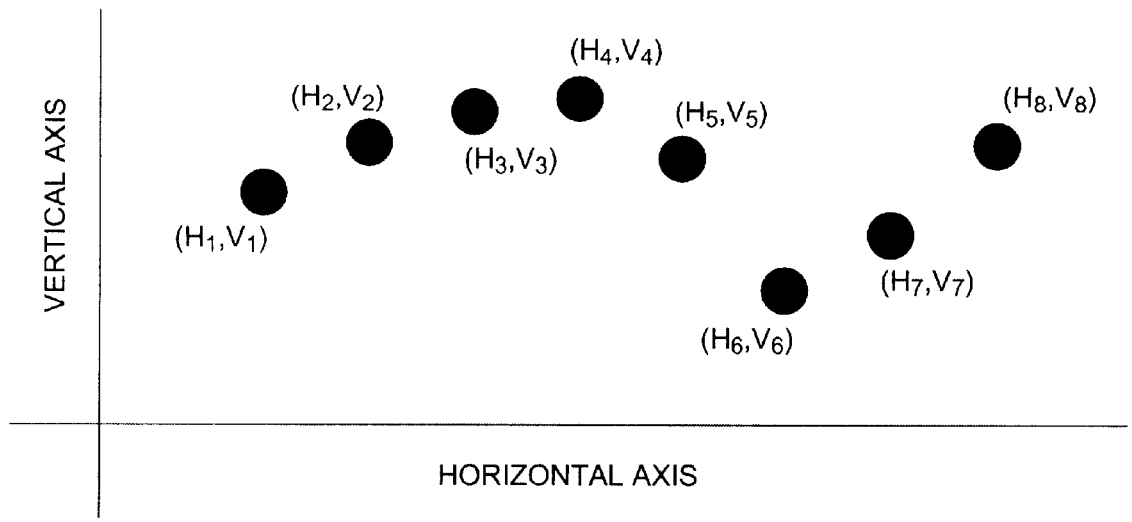
FIG. 1 is a graph showing a relationship between vertical and horizontal positions.

In many existing GPS systems, the position solution does not take into consideration the relationship between horizontal position (latitude and longitude) and vertical position (altitude). In existing systems, the solution is formed independently from the knowledge of the interrelation of horizontal and vertical position. The relationship between horizontal location and vertical elevation is available from digital elevation maps (DEM) and various GIS databases (see FIG. 1). By utilizing this relationship, extra information is available for a position solution.

In those existing systems that do use altitude information (for example, U.S. Pat. No. 6,061,018), a real-time mobile communications link is required. However, even this system seems not to discuss the use of altitude (i.e., vertical dimension) to improve the horizontal estimate.

The present invention uses altitude information to constrain the horizontal position solution so that the error in altitude can be minimized. The solution in the present invention improves position accuracy without explicit use of a cellular data link, as explicitly stated in U.S. Pat. No. 6,061,018. The present invention is not restricted in any way by the data communication method. The solution of the present invention improves position knowledge in all three spatial dimensions, not just one.

Figure 2:
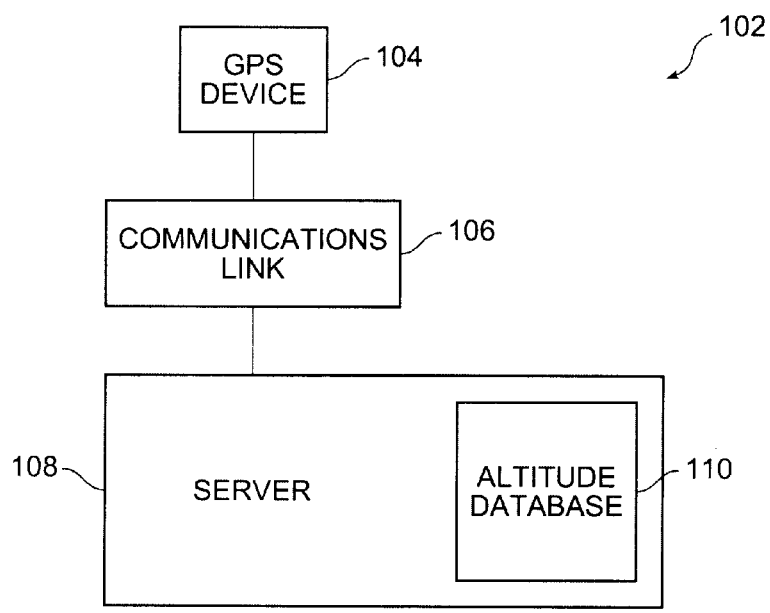
FIG. 2 is a block diagram of a system according to an embodiment of the present invention.

FIG. 2 is a block diagram of one embodiment of the present invention. A GPS system 102 includes a GPS device 104, a communications link 106, a server 108, and an altitude database 110.

The GPS device 104 receives GPS data in the form of pseudorange measurements from GPS satellites in a manner known in the GPS art. The GPS measurements may be in the form of codephase pseudorange measurements, times of satellite signal transmission, sub-integer codephase measurements, delta-pseudorange measurements, a GPS almanac-derived position, or other formats. The GPS device 104 may be coupled with a communications device such as a cellular telephone, or the GPS device 104 may be a standalone device.

The communications link 106 communicates the GPS data to the server 108. If the GPS device 104 also includes a communications device such as a cellular telephone, the communications link 106 may also be used for transmitting communications information. In such a case the communications link 106 includes portions of a cellular communications network and may also include portions of a landline communications network. The communications link 106 may also include portions of the Internet.

Figure 3:
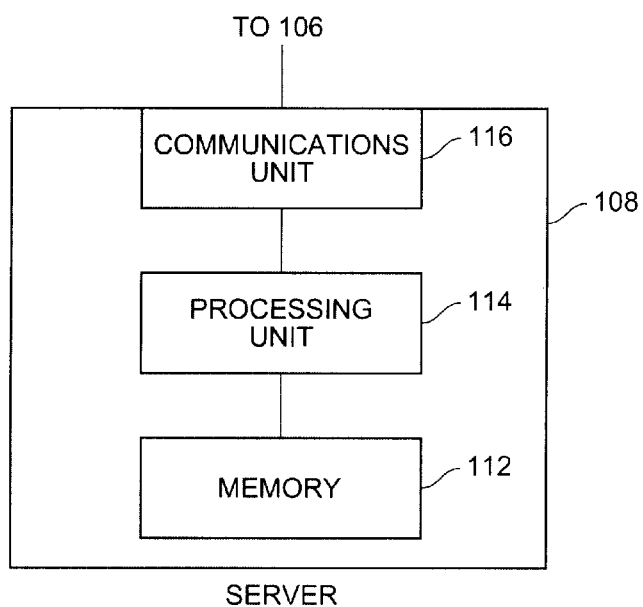
FIG. 3 is a block diagram of a server according to an embodiment of the present invention.

The server 108 processes the GPS data as further detailed below with reference to FIG. 4. FIG. 3 shows that the server 108 includes a memory 112, a processing unit 114 and a communications unit 116. The memory 112 stores the altitude database 110. The memory 112 may also store various computer programs that may be executed by the processing unit 114.

The processing unit 114 controls the server 108 and executes processing to process the GPS data, as further detailed below with reference to FIG. 4. The processing unit may execute computer programs stored in the memory 112.

The communications unit 112 receives GPS data from the GPS device 104, and transmits the results generated by the server 108 to the GPS device 104, via the communications link 106.

Returning to FIG. 2, the altitude database 110 contains latitude, longitude and altitude information. That is, each latitude and longitude combination has associated therewith an altitude. Such association allows an altitude to be determined based on any given combination of latitude and longitude. The altitude data in the database 110 may be derived from uniform latitude and longitude grids, or from non-uniform latitude and longitude grids. The altitude data in the database 110 may also be generated from previous complete latitude, longitude, altitude and clock solutions.

In an alternative embodiment, the altitude database 110 need not be stored on the server 108, but may instead be accessed remotely by the server 108, for example by another communications link.

In another alternative embodiment, the functionality of the server 108 and the altitude database 110 may be incorporated into that of the GPS device 104. In such an embodiment the communications link 106 is unnecessary for GPS purposes (but could still be retained for other purposes, for example if the GPS device 104 also includes a communications device such as a cellular telephone). In accordance with memory constraints of the GPS device 104, the altitude database 110 may cover a reduced area in order to decrease its storage requirements.

In yet another alternative embodiment, the functionality of the server 108 (without the database 110) may be incorporated into that of the GPS device 104. In such an embodiment the communications link 106 may be used to remotely access the database 110. If the GPS device 104 also includes a communications device such as a cellular telephone, the communications link 106 may also be used for other communications purposes, or another communications link could be used.

Figure 4:
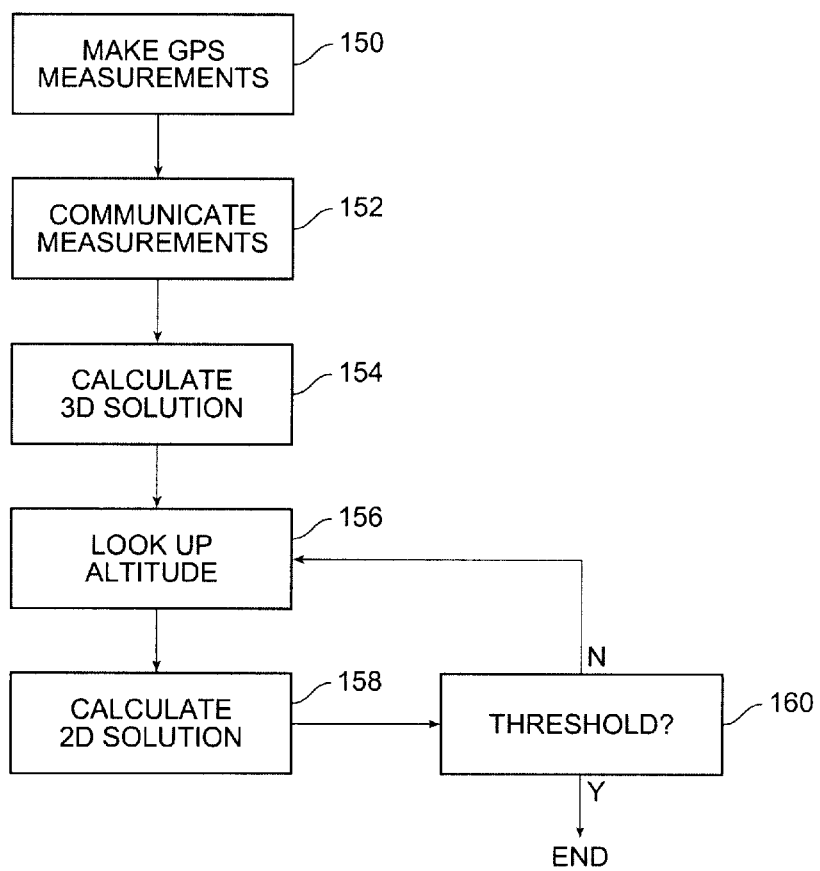
FIG. 4 is a flowchart of a method according to an embodiment of the present invention.

FIG. 4 is a flowchart showing the operation of the GPS system 102 of FIG. 2. In step 150, the GPS device 104 makes GPS measurements. The measurements are generally made by a GPS receiver core that measures the timing difference between its own internal representation of time and the time the satellite signal was generated, as known in the art. The measurements may be represented as pseudoranges. A second alternative for the measurements may be represented as sub-integer millisecond codephases. These codephases are output from the internal receiver tracking architecture. Pseudoranges are derived from the codephases by resolving uncertainties in range and clock offsets. A third alternative for the measurements are time of transmission of the satellite signals. Since pseudoranges are utilized as timing measurements between the satellite and the receiver the time of the satellite reception combined with a pseudorange can be used to find the time of signal transmission. By using the time of satellite transmission from each satellite along with the combined reception time, the pseudoranges could be defined. A fourth alternative would use delta-pseudoranges where a single satellite pseudorange is differenced from the rest of the psuedoranges to produce a set of pseudorange differences. Other alternatives may also be utilized.

Four such GPS measurements are generally made, but more may be made. These measurements are generally made at a given epoch (or instantaneous sample) as is known in the art. However, the measurements need not be performed at the same time and can be made over multiple epochs; they merely need to be represented at the same time. That is, measurements made at different times may be interpolated to the same time as long as the errors introduced by the interpolation are small as compared to the errors present in the normal measurement process. Such a measurement time frame can be a few seconds at a minimum. The GPS device 104 may process the GPS measurements into a GPS location and may display that to the user, as known in the art, if desired.

In step 152, the GPS device 104 communicates the measurements to the server 108. The details of the communication will depend upon the specific alternative embodiment implemented as discussed above regarding FIG. 2.

In step 154, the server 108 calculates a position of the GPS device 104 from the measurements. The details of the calculation are discussed below in the section "Calculation Details". At this point, the position is calculated using what is known as a 3D-plus-clock solution. (Often the 3D-plus-clock solution is simply referred to as a 3D solution.) Such a 3D solution contains latitude data, longitude data, altitude data, and clock data. Poor geometrical configuration of the satellites from which the measurements are derived can cause this 3D solution to be inaccurate. However, it is useful for obtaining a starting position.

In step 156, the server 108 uses the latitude and longitude of the position calculated in step 154 (or step 158; see below) to look up an altitude for that position in the altitude database 110. Note that if the altitude from the database differs from the altitude calculated in the 3D solution in step 154, this indicates either an inaccurate measurement or that the GPS receiver is at an altitude undefined in the database (for example, on the upper floors of a building or airborne).

In step 158, the server 108 uses the altitude determined in step 156 to calculate a revised position of the GPS device 104 from the measurements. The details of the calculation are discussed below in the section "Calculation Details". At this point, the position is calculated using what is known as a 2D-plus-clock solution because one dimension (the altitude) is fixed. (Often the 2D-plus-clock solution is simply referred to as a 2D solution.) Such a 2D solution includes latitude data, longitude data and clock data.

In step 160, the server 108 compares the result of the calculation in step 158 with the result of the prior calculation in step 158. If they are within a defined threshold of another, the process ends. If they are not, then the process return to step 156 to perform further iterations. Further details regarding the comparison and the threshold are given below in the section "Calculation Details".

As a result of the above process, the server 108 uses the altitude information (vertical information) from the database 110 to iteratively improve the determination of the horizontal position (latitude and longitude) of the GPS device 104. Generally, four GPS measurements at a single epoch for are used for the 3D solution, and the iteration is performed using 2D solutions.

Calculation Details

The pseudorange residuals that are passed to the routines that solve for user position are:

$\Delta \rho_i^k \doteq$ pseudorange residual for user $i$ and satellite $k$ $$\Delta \rho_i^k = \Delta r^k \cdot 1_i^k + \Delta b_i - \Delta B^k + I_i^k - T_i^k + v \quad (1)$$

where:

$\Delta \rho_i^k \doteq$ pseudorange residual for station i and satellite k $\Delta r^k \doteq$ ephemeris error for satellite k $1_i^k \doteq$ normalized Line-Of-Sight (LOS) from station i to satellite k $\Delta b_i \doteq$ clock offset from GPS time for station i $\Delta B^k \doteq$ clock offset from GPS time for satellite k $I_i^k \doteq$ L1 ionospheric delay from user i to satellite k $T_i^k \doteq$ L1 tropospheric delay from user i to satellite k $v \doteq$ pseudorange measurement error The users collect GPS observables (in this case the codephase pseudorange measurements). To relate the uncertainty in the measurement data to the uncertainty in the user position, we look at a small variation of the user position, $\Delta$ ū, which, projected into the reference station pseudorange domain, is:

$$\begin{bmatrix} \Delta\rho_u^1 \\ \Delta\rho_u^2 \\ \vdots \\ \Delta\rho_u^k \end{bmatrix} = \begin{bmatrix} 1_u^1 & 1 \\ 1_u^2 & 1 \\ \vdots & 1 \\ 1_u^k & 1 \end{bmatrix} \cdot \begin{bmatrix} \Delta\bar{u} \\ \Delta b_u \end{bmatrix} + \varepsilon \quad (2)$$

$$\delta\rho = H\delta u + \varepsilon$$

where $1_i^k$ is the normalized LOS between the $k^{th}$ satellite and user (3-by-1 row vector), H is the projection matrix formed along the LOS between the satellite and the user, and $\epsilon$ is the measurement error.

User position error can be estimated with the normalized pseudoinverse as discussed in G. Strang, *Linear Algebra and Its Applications, Third Edition* (Harcourt Brace Jovanovich, 1988):

$$\delta u = (H^T H)^{-1} H^T \delta\rho \quad (3)$$

This equation relates the measurement residuals to a position error estimate. The 3D-plus-clock user position error estimate is a 4-by-1 column vector representing the East, North, Up position and the Clock errors respectively. By fixing the Up (or altitude above a reference surface) component a 2D-plus-clock user position error estimate can be found.

The resulting covariance matrix relating the measurement error covariance to the covariance user position estimate. To achieve this, we solve for the covariance of δu:

$$Cov(\delta u) = E[\delta u \cdot \delta u^T] \quad (4)$$
$$= E\left[(H^T H)^{-1} H^T \delta\rho \cdot \left((H^T H)^{-1} H^T \delta\rho\right)^T\right]$$
$$= E\left[(H^T H)^{-1} H^T \delta\rho \cdot \delta\rho^T H (H^T H)^{-1}\right]$$

Since the projection matrix is deterministic, the expected value operator, E[ ], can be taken inside the equation:

$$Cov(\delta u) = (H^T H)^{-1} H^T (E[\delta\rho \cdot \delta\rho^T]) H (H^T H)^{-1} \quad (5)$$
$$= H^{-1}(Cov(\delta\rho))(H^T)^{-1}$$

After bringing the inversion outside of the expression:

$$Cov(\delta u) = [H^T Cov(\delta\rho)^{-1} H]^{-1} \quad (6)$$

Equation (6) gives us an expression to relate the pseudorange covariance, Cov(δρ), to the user position covariance, Cov(δu). The value of the position covariance is directly related to the geometry of the problem (H) and the covariance of the measurement driven by the factors shown in Equation (1). The 3D-plus-clock user position covariance is a 4-by-4 matrix representing the East, North, Up position variances and the Clock variance. As is the case with the position solution; if the Up component is fixed the 2D-plus-clock user position and clock covariance can be established.

Returning to the process of FIG. 4, at first the 3D-plus-clock solution is performed to establish a reference 'Up' value (see steps 154, 156). This is used to fix the up position and the 2D Plus Clock solution is formed (see step 158). By using the covariance estimates a convergence criterion can be established such that the solution iteration continues until some minimum is reached or some covariance threshold is met (see step 160). The threshold is formed by the norm of the position covariance such:

$$\text{covariance threshold} = \|\delta u \cdot \delta u^T\| \quad (7)$$

The covariance threshold could be set a priori based on an expected position uncertainty. In some cases, an expectation of position uncertainty may be required, which would set the covariance threshold. In a second technique, if the pseudorange uncertainty covariance is known or modeled, then the norm of the covariance in Equation (6) can be used as the threshold. In a third technique, an increase in the threshold is found. This technique compares the value of Equation (7) after each iteration to the previous iteration value. At the point where the threshold increases then a minimum is reached.

Figure 5:
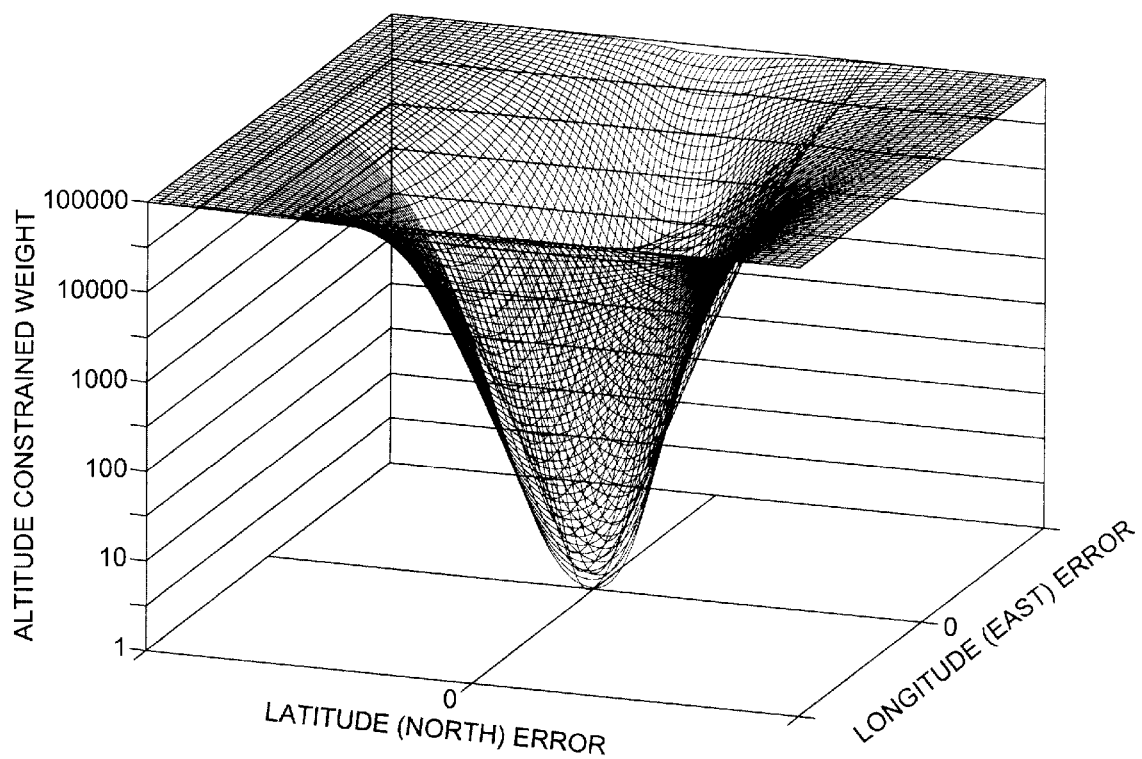
FIG. 5 is a graph showing the convergence of the process shown in FIG. 4.

FIG. 5 shows the motivation for the altitude solution method presented in the preferred embodiment. By utilizing an altitude database, a minimization of a cost function can be found versus horizontal position. This cost function correlates with the "Altitude-Constrained Weight" dimension shown in FIG. 5. An alternate embodiment of this invention could directly model this cost function to solve for the horizontal position to minimize this cost.

The above detailed description has focused on describing various embodiments of the invention. The specification and drawings are, accordingly, to be regarded in an illustrative rather than a restrictive sense. It will, however, be evident that various modifications and changes and their equivalents may be made thereunto without departing from the broader spirit and scope of the invention as set forth in the claims.

What is claimed is:

1. A method of determining a global positioning system (GPS) location, comprising the acts of:
   receiving GPS measurements from a GPS device;
   calculating, as a three-dimensional solution, an initial position of said GPS device from said GPS measurements;
   determining, from an altitude database, an initial altitude corresponding to an initial latitude and an initial longitude of said initial position;
   calculating, as a two-dimensional solution using said initial altitude, a revised position of said GPS device from said GPS measurements;
   determining, from said altitude database, a revised altitude corresponding to a revised latitude and a revised longitude of said revised position; and
   calculating, as another two-dimensional solution using said revised altitude, another revised position of said GPS device from said GPS measurements.

2. The method of claim 1, further comprising:
   iteratively performing the acts of determining and calculating until a defined threshold is met.

3. The method of claim 1, wherein said GPS measurements comprise at least four GPS measurements.

4. The method of claim 1, wherein said GPS measurements comprise at least four GPS measurements in a defined epoch.

5. The method of claim 1, wherein said GPS measurements comprise at least four GPS measurements in a plurality of epochs.

6. The method of claim 1, wherein said three-dimensional solution comprises latitude data, longitude data, altitude data, and clock data.

7. The method of claim 1, wherein said two-dimensional solution comprises latitude data, longitude data, and clock data.

8. The method of claim 1, wherein said GPS measurements comprise codephase pseudorange measurements.

9. The method of claim 1, wherein said GPS measurements comprise times of satellite signal transmission.

10. The method of claim 1, wherein said GPS measurements comprise sub-integer millisecond codephase measurements.

11. The method of claim 1, wherein said GPS measurements comprise delta-pseudorange measurements.

12. The method of claim 1, wherein said GPS measurements comprise a GPS almanac-derived position.

13. The method of claim 1, wherein said altitude database includes data formed from uniform latitude and longitude grids.

14. The method of claim 1, wherein said altitude database includes data formed from non-uniform latitude and longitude grids.

15. The method of claim 1, wherein said altitude database includes data formed from previous complete latitude, longitude, altitude and clock solutions.

16. A system for determining a global positioning system (GPS) location, comprising:
a communications unit configured to receive GPS measurements from a GPS device;
a memory configured to store an altitude database; and
a processing unit, coupled to said communications unit and said memory, configured to execute processing including the acts of:
calculating, as a three-dimensional solution, an initial position of said GPS device from said GPS measurements;
determining, from said altitude database, an initial altitude corresponding to an initial latitude and an initial longitude of said initial position;
calculating, as a two-dimensional solution using said initial altitude, a revised position of said GPS device from said GPS measurements;
determining, from said altitude database, a revised altitude corresponding to a revised latitude and a revised longitude of said revised position; and
calculating, as another two-dimensional solution using said revised altitude, another revised position of said GPS device from said GPS measurements,
wherein said communications unit is further configured to transmit said another revised position to said GPS device.

17. The system of claim 16, wherein said processing unit is further configured to execute processing including:
iteratively performing the acts of determining and calculating until a defined threshold is met.

18. The system of claim 16, wherein said three-dimensional solution comprises latitude data, longitude data, altitude data, and clock data.

19. The system of claim 16, wherein said two-dimensional solution comprises latitude data, longitude data, and clock data.

20. The system of claim 16, wherein said GPS measurements comprise codephase pseudorange measurements.

21. The system of claim 16, wherein said GPS measurements comprise delta-pseudorange measurements.

22. The system of claim 16, wherein said altitude database includes data formed from uniform latitude and longitude grids.

23. The system of claim 16, wherein said altitude database includes data formed from previous complete latitude, longitude, altitude and clock solutions.

24. A system for determining a global positioning system (GPS) location, comprising:
a GPS device configured to provide GPS measurements; and
a server configured to communicate with said GPS device, wherein said server includes a processor configured to execute processing including the acts of:
calculating, as a three-dimensional solution, an initial position of said GPS device from said GPS measurements;
determining, from an altitude database, an initial altitude corresponding to an initial latitude and an initial longitude of said initial position;
calculating, as a two-dimensional solution using said initial altitude, a revised position of said GPS device from said GPS measurements;
determining, from said altitude database, a revised altitude corresponding to a revised latitude and a revised longitude of said revised position; and
calculating, as another two-dimensional solution using said revised altitude, another revised position of said GPS device from said GPS measurements.

25. The system of claim 24, wherein said processor is further configured to execute processing including:
iteratively performing the acts of determining and calculating until a defined threshold is met.

26. The system of claim 24, wherein said three-dimensional solution comprises latitude data, longitude data, altitude data, and clock data.

27. The system of claim 24, wherein said two-dimensional solution comprises latitude data, longitude data, and clock data.

28. The system of claim 24, wherein said GPS measurements comprise codephase pseudorange measurements.

29. The system of claim 24, wherein said GPS measurements comprise delta-pseudorange measurements.

30. The system of claim 24, wherein said altitude database includes data formed from uniform latitude and longitude grids.

31. The system of claim 24, wherein said altitude database includes data formed from previous complete latitude, longitude, altitude and clock solutions.

32. A computer program for determining a global positioning system (GPS) location, said computer program embodied on a computer-readable medium and configured to control a computing device to execute processing comprising the acts of:
receiving GPS measurements from a GPS device;
calculating, as a three-dimensional solution, an initial position of said GPS device from said GPS measurements;
determining, from an altitude database, an initial altitude corresponding to an initial latitude and an initial longitude of said initial position;
calculating, as a two-dimensional solution using said initial altitude, a revised position of said GPS device from said GPS measurements;
determining, from said altitude database, a revised altitude corresponding to a revised latitude and a revised longitude of said revised position; and
calculating, as another two-dimensional solution using said revised altitude, another revised position of said GPS device from said GPS measurements.

33. The computer program of claim 32, wherein said computer program further controls said computing device to execute processing comprising:

iteratively performing the acts of determining and calculating until a defined threshold is met.

34. The computer program of claim 32, wherein said three-dimensional solution comprises latitude data, longitude data, altitude data, and clock data.

35. The computer program of claim 32, wherein said two-dimensional solution comprises latitude data, longitude data, and clock data.

36. The computer program of claim 32, wherein said GPS measurements comprise codephase pseudorange measurements.

37. The computer program of claim 32, wherein said GPS measurements comprise delta-pseudorange measurements.

38. The computer program of claim 32, wherein said altitude database includes data formed from uniform latitude and longitude grids.

39. The computer program of claim 32, wherein said altitude database includes data formed from previous complete latitude, longitude, altitude and clock solutions.

40. A global positioning system (GPS) device, comprising:
    a GPS receiver configured to make GPS measurements;
    a memory configured to store an altitude database; and
    a processing unit, coupled to said GPS receiver and said memory, configured to execute processing including the acts of:
        calculating, as a three-dimensional solution, an initial position of said GPS device from said GPS measurements;
        determining, from said altitude database, an initial altitude corresponding to an initial latitude and an initial longitude of said initial position;
        calculating, as a two-dimensional solution using said initial altitude, a revised position of said GPS device from said GPS measurements;
        determining, from said altitude database, a revised altitude corresponding to a revised latitude and a revised longitude of said revised position; and
        calculating, as another two-dimensional solution using said revised altitude, another revised position of said GPS device from said GPS measurements.

41. The GPS device of claim 40, wherein said processing unit is further configured to execute processing including:
    iteratively performing the acts of determining and calculating until a defined threshold is met.

42. The GPS device of claim 40, wherein said three-dimensional solution comprises latitude data, longitude data, altitude data, and clock data.

43. The GPS device of claim 40, wherein said two-dimensional solution comprises latitude data, longitude data, and clock data.

44. The GPS device of claim 40, wherein said GPS measurements comprise codephase pseudorange measurements.

45. The GPS device of claim 40, wherein said GPS measurements comprise delta-pseudorange measurements.

46. The GPS device of claim 40, wherein said altitude database includes data formed from uniform latitude and longitude grids.

47. The GPS device of claim 40, wherein said altitude database includes data formed from previous complete latitude, longitude, altitude and clock solutions.

* * * * *